United States Patent [19] [11] Patent Number: 4,531,378
Nishi et al. [45] Date of Patent: Jul. 30, 1985

[54] AUTOMOTIVE REFRIGERATION SYSTEM

[75] Inventors: Yasuyuki Nishi, Obu; Masasi Takagi, Kariya; Masao Sakurai, Obu, all of Japan

[73] Assignee: Nippondenso Co. Ltd., Kariya, Japan

[21] Appl. No.: 603,413

[22] Filed: Apr. 24, 1984

Related U.S. Application Data

[63] Continuation-in-part of Ser. No. 441,861, Nov. 15, 1982, abandoned.

[30] Foreign Application Priority Data

Nov. 16, 1981 [JP] Japan ................ 56-183498

[51] Int. Cl.$^3$ ............................. F25B 41/04
[52] U.S. Cl. ..................... 62/217; 62/228.5
[58] Field of Search ............ 62/217, 196.3, 228.4, 62/228.5, 227

[56] References Cited

U.S. PATENT DOCUMENTS

| 1,780,442 | 11/1930 | Schmieding | 62/217 X |
|---|---|---|---|
| 2,019,724 | 11/1935 | Otto | |
| 2,316,066 | 4/1943 | Haymond | 62/217 |
| 2,328,824 | 9/1943 | McCormack et al. | |
| 2,577,902 | 12/1951 | McGrath | |
| 2,983,111 | 5/1961 | Miner et al. | 62/217 X |
| 3,803,863 | 4/1974 | Jednacz et al. | |
| 3,818,717 | 6/1974 | Peruglia | |
| 3,977,207 | 8/1976 | Scherer et al. | |
| 4,342,199 | 12/1982 | Shaw et al. | |

FOREIGN PATENT DOCUMENTS 569694 3/1929 Fed. Rep. of Germany ........ 62/227

Primary Examiner—William E. Wayner
Attorney, Agent, or Firm—Cushman, Darby & Cushman

[57] ABSTRACT

A refrigeration system for use in an automotive air conditioning system has a variable displacement refrigerant compressor drivingly connectable by an electromagnetic clutch to an automotive engine, a refrigerant evaporator through which air is caused to flow by a blower, and a throttling valve which prevents the refrigerant pressure in the evaporator from lowering over the predetermined pressure, so that frost or icing is not formed on the evaporator fins.

The compressor is provided with one or two unloading ports for releasing the refrigerant being compressed and with a valve member or members associated with the unloading port. The operation of the throttling valve is detected by a sensor which emits a signal to an electric circuit for actuating the valve member or members so that the unloading port is selectively or gradually opened to vary the compressor displacement to provide a multi-stage or continuous compressor.

4 Claims, 14 Drawing Figures (a)

(b)

AUTOMOTIVE REFRIGERATION SYSTEM

This is a continuation-in-part of applicant's prior co-pending application Ser. No. 441,861 filed on Nov. 15, 1982 now abandoned.

BACKGROUND OF THE INVENTION

The present invention relates to a refrigeration system for use in an automotive air conditioning system which improves economy of power and feeling of cooling.

DESCRIPTION OF THE PRIOR ART

A typical conventional automotive air conditioning system employs a vapor compression type refrigeration cycle consisting essentially of a compressor, a condenser, a receiver, an expansion valve and an evaporator. Since the compressor is driven by the automobile engine through an electromagnetic clutch, the operational speed of the compressor is naturally increased as the engine speed becomes higher. In this conventional air conditioning system, it is often experienced that a frosting or icing takes place on the fins of the evaporator as the surface temperature of the evaporator fins, namely, the evaporation temperature of the refrigerant, comes down considerably below 0° C. due to either the increase in the operational speed of the compressor or the reduction of the cooling load. The frosting or icing on the fins reduces the rate of the air flow from a blower through the evaporator, resulting in a reduction in the air cooling capacity.

In order to prevent the frosting or icing on the evaporator fins or to control the air temperature in the automobile, a pressure check valve or a throttling valve is equipped between the evaporator and compressor to prevent the evaporation temperature from becoming considerably low over 0° C.

This arrangement, however, has the following drawbacks.

During the operation of the compressor, the displacement of the compressor is in the maximum capacity out of relation to any cooling load. In consequence, the maximum load torque is imparted to the engine so that power is consumed wastefully and much noise is made. On the other hand, when the compressor is stopped to avoid the wasteful operation of the compressor, the air temperature just downstream of the evaporator is varied widely due to the discontinuous operation of the compressor to give an unpleasant feeling of cooling to the users.

SUMMARY OF THE INVENTION

It is a primary object of the present invention to provide an improved refrigeration system which is entirely free from above-discussed problems.

It is another object of the present invention to provide an air conditioning system in which the displacement of a compressor is varied in accordance with the cooling load.

The automotive refrigeration system according to the present invention essentially comprises a variable capacity refrigerant compressor adapted to be drivingly connected and disconnected to and from an automotive engine by means of an electromagnetic clutch. The compressor includes means for varying the displacement of the compressor and is disposed in fluid-flow communication with a refrigerant evaporator of a refrigeration cycle. The refrigeration system also includes a throttling valve to prevent the refrigerant pressure in the evaporator to come considerably below 0° C.

A condition related to the cooling operation is detected by a sensor which emits a signal. The refrigeration system further includes electric circuit means operative in response to the signal from the sensor means to actuate means for controlling the compressor displacement varying means so that the displacement of the compressor is varied in accordance with the sensor signal. The electric circuit means is further operative to control the operation of the electromagnetic clutch.

The compressor may be of a vane type. The compressor displacement varying means may comprise at least one unloading port formed in the compressor and being adapted to release the refrigerant being compressed and a valve member operatively associated with the unloading port. The controlling means may comprise a pressure responsive actuator operatively connected to the valve member and a solenoid valve means adapted to be actuated by electric circuit means to control the application of a pressure to the pressure responsive actuator. When the unloading port is opened by the valve member, the compression of the refrigerant in a working space in the compressor is not started until after the working space is moved out of communication with the unloading port. Thus, the displacement of the compressor is reduced from the maximum compressor displacement which is obtained when the unloading port or ports are all closed by the associated valve member or members. The valve member or members are opened and closed in accordance with the signal emitted by the sensor means to the electric circuit means so that the compressor displacement can be varied stepwise or gradually to provide a multi-stage or continuous displacement control. In the case where a single unloading port is employed, the system provides two stages of compressor displacement control, whereas the system can provide three stages of compressor displacement control in the case where two unloading ports are utilized. This multi-stage compressor displacement control is combined with the clutch engagement and disengagement control to provide an increased number of stages of compressor displacement control.

The sensor means may detect the cooling condition through the movement of a valve body of the throttling valve. It is effective to detect the operational conditions of the throttling valve by the sensor, thereby controlling the capacity or displacement of the compressor as required in response to those conditions.

The throttling valve for controlling refrigerant pressure in the evaporator prevents the temperature of the evaporator from lowering considerably below 0° C. so that frost is not formed on the evaporator fins, and it is not necessary to stop the compressor, and the air temperature just downstream of the evaporator is not cooled too much and kept comparatively constant.

The above and other objects, features and advantages of the present invention will be made apparent by the following description with reference to FIGS. 1 through 12 of the accompanying drawings.

DESCRIPTION OF THE PREFERRED EMBODIMENTS

Figure 1:
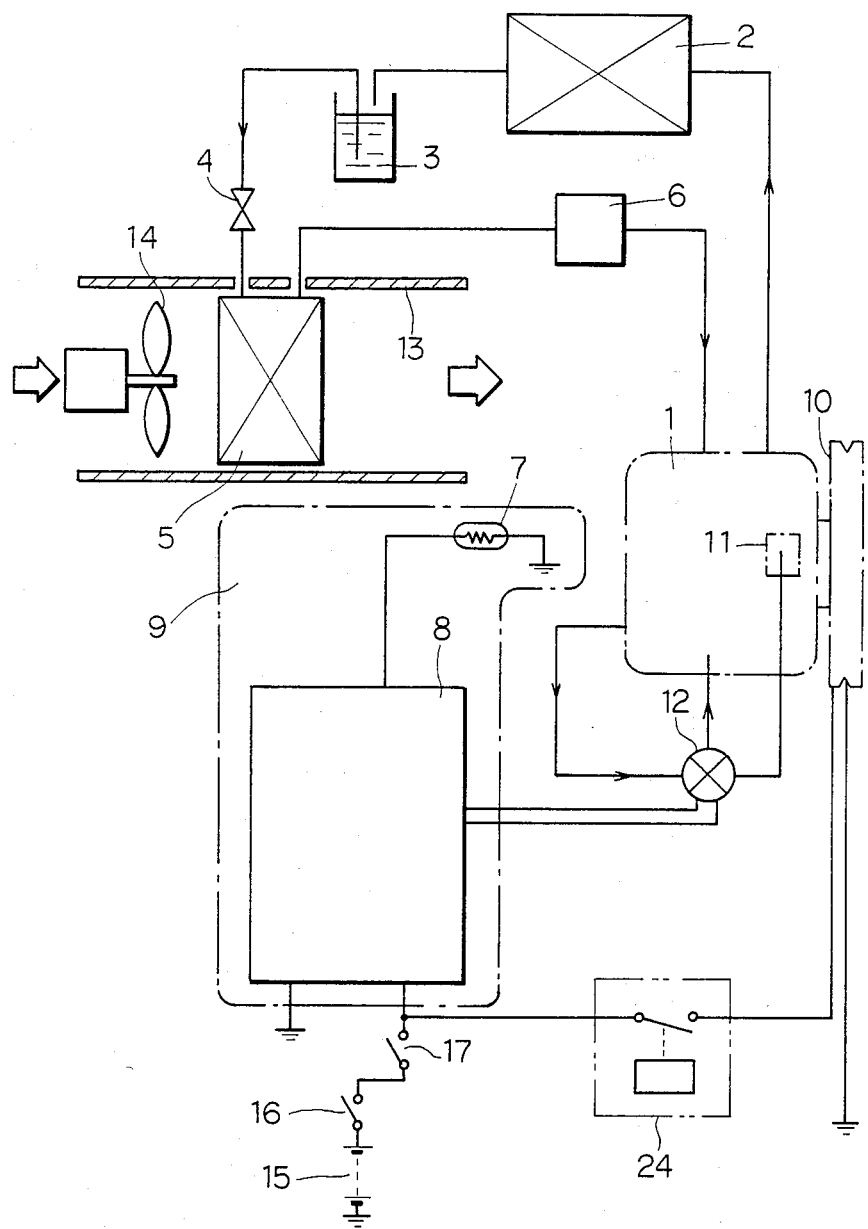
FIG. 1 is a diagrammatic illustration of an embodiment of the refrigeration system according to the present invention.

The refrigeration system embodying the present invention is shown in FIG. 1. The refrigeration system consists essentially of a compressor 1, a condenser 2, a receiver 3, an expansion valve 4, an evaporator 5, a throttling valve 6, a sensor 7 detecting the temperature related the cooling load of the compressor 1 and a controlling circuit 8 receiving the signal of the sensor 7.

The compressor 1 is adopted to be driven by the automobile engine (not shown) through an electromagnetic clutch 10. As will be described later, this compressor 1 is of variable capacity or variable discharge type including displacement varying means 11. The sensor 7 consisting of a thermistor is adopted to detect the ambient air temperature. The output signal of the sensor 7 is delivered to a controlling circuit 8 adopted to control solinoid-operated pilot valve 12 for actuating or controlling the compressor displacement varying means 11. The condenser 2 may be usually placed in front of the radiator of an automobile. The refrigerant gas out of compressor 1, which is of high temperature and pressure, is cooled here by the blow from the cooling fan of the engine and air flowing in by running of the automobile. Thus the gas is changed to liquid-refrigerant. The receiver 3 is to store this liquid-refrigerant for supplying to the evaporator 5 in response to the cooling load. The expansion valve 4 acts to reduce the pressure by expanding the liquid-refrigerant sprayed out of a small hole to become the vapor-refrigerant. The evaporator 5 is composed of a corrugated pipe through which the vapor-refrigerant flows, and evaporator fins welded to the pipe. The air blown by the motor-driven blower 14 is cooled by the evaporator 5. The evaporator 5 and the blower are disposed in a plastic duct 13. The duct is communicated at its left-hand end with an ambient air intake opening through a communication-switching box which is not shown. The duct is also communicated at its right-hand end with air outlets open to the passenger compartment, such as upper air outlets for cooled air and lower air outlets for warmed air. A heater unit, not shown, is disposed in the duct 13.

Figure 12:
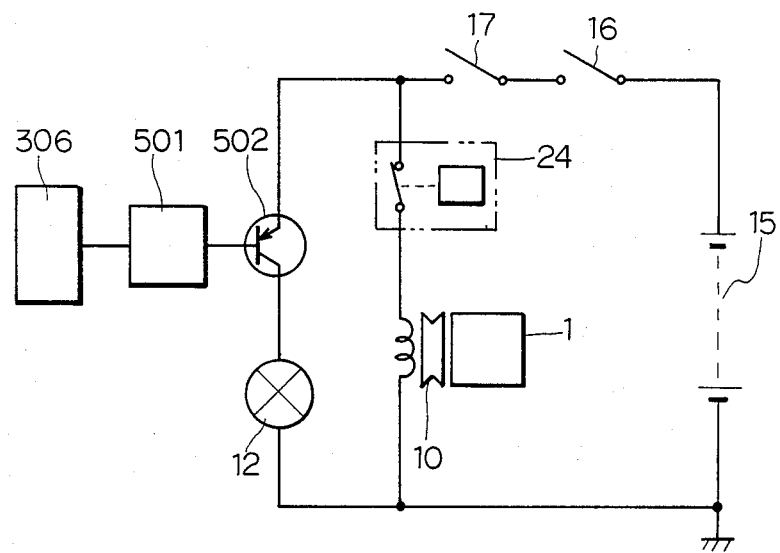
FIG. 12 shows an electric circuitry of the controlling circuit with the sensor shown in FIG. 11.

The throttling valve 6 for controlling the pressure in the evaporator 5 is placed between the evaporator 5 and the compressor 1, which is composed of a valve, spring, and diaphragm as shown in FIG. 12. When the cooling load is lowered and the pressure in the evaporator 5 is low, the spring forces the diaphram and the valve body unitary therewith, overcoming pressure of the refrigerant so that the valve is closed. The valve of the present embodiment uses the spring to adjust its compressive pressure so as to control the evaporating pressure of the refrigerant at 0° C. at about 2.1 Kg/cm$^2$ G when R-12 is used for refrigerant, so that the valve prevents the temperature of the refrigerant from lowering under 0° C. Also, the valve prevents the frosting or icing on the evaporator fins.

A relay 24 is provided to control the electrical supply to the electromagnetic clutch 10 to thereby connect and disconnect the compressor 1 to and from an automotive engine. The operation of the air conditioner can be manually controlled by an air-conditioner switch 17 which is provided in series with an engine ignition switch 16 which in turn is provided in series with batteries 15 mounted on an associated automobile.

Figure 2:
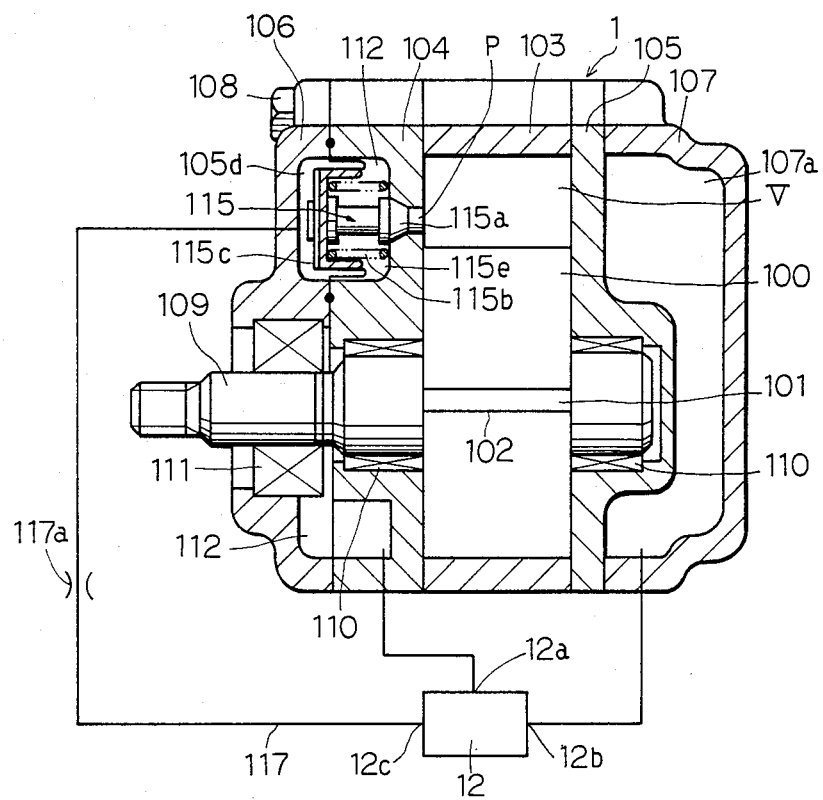
FIG. 2 is an axial sectional view of the compressor shown in FIG. 1.
Figure 3:
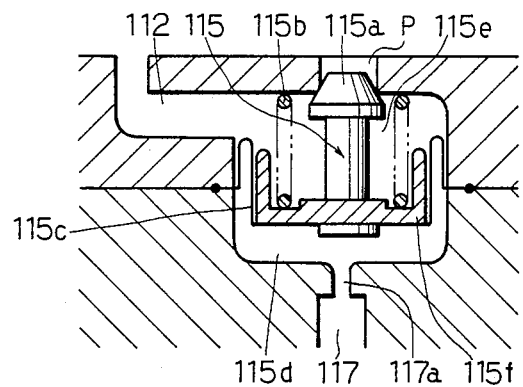
FIG. 3 is an enlarged fragmentary sectional view of the compressor showing the structural details of an on-off valve shown in FIG. 2.
Figure 4:
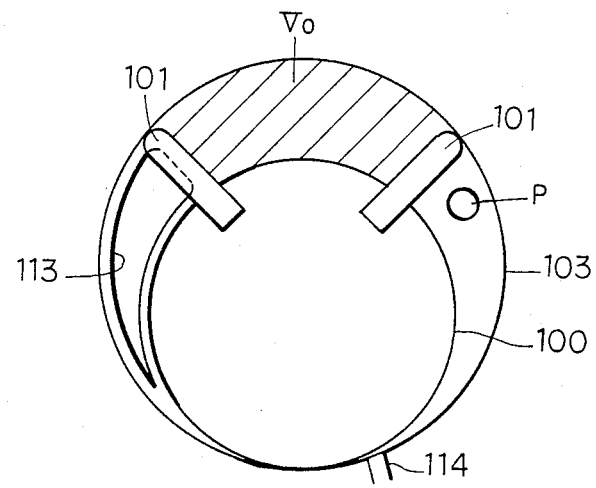
FIGS. 4(a) and 4(b) are diagrammatic cross-sectional views of the compressor cylinder and rotor showing the rotor in different positions to illustrate the compressor displacement changes.
Figure 4:
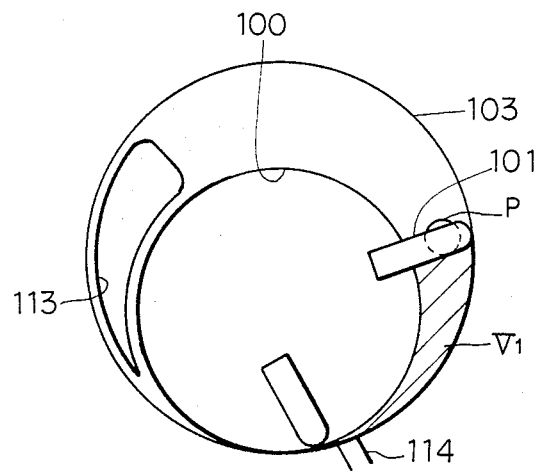

Referring now to FIGS. 2–4 the compressor 1 includes a cylindrical rotor 100 carying a plurality of vanes 101 mounted for radial sliding movement in radial grooves 102 formed in the outer peripheral portion of the rotor. Two vanes 101 only are shown in FIGS. 4(a)–4(b) but it can be appreciated by those in the art that in fact the rotor 100 caries four vanes arranged at equal angular intervals. The rotor 100 is disposed eccentrically in a cylinder 103 having an inner peripheral surface which limits the radial outer movements of respective vanes 101 and with which the vanes are in slidable contact at their outer ends. Front and rear end plates 104 and 105 are secured to the opposite ends of the cylinder 103. The rotor 100 and the vanes 101 are axially dimentioned such that their opposite axial ends are spaced from the end plates 104 and 105 so that very small gaps are defined therebetween.

The rotor 100, vanes 101, cylinder 103 and front and rear end plates 104 and 105 cooperate together to define variable working spaces V the volume of which is varied as the rotor 100 is rotated with the vanes 101. The cylinder 103, front and rear end plates 104 and 105 and a pair of housing members 106 and 107 are secured together by bolts 108 to form a unitary structure. The rotor 100 is rigidly mounted on a shaft 109 which in turn is rotatably mounted on the front and rear end plates 104 and 105 by means of bearings 110 and adapted to be driven by the engine through torque transmission means including the electromagnetic clutch 10 referred to above. A seal 111 is provided between the shaft 109 and the housing member 106.

The front end plate 104 and the housing member 106 cooperate to define therebetween an intake chamber 112 connected to the evaporator 5 through the throttling valve 6 to receive the refrigerant therefrom. The front end plate 104 defines therein an intake port 113 (see FIGS. 4(a)–4(b)) through which the intake chamber 112 is adapted to be communicated with successive working spaces V so that the refrigerant is sucked from the intake chamber 112 into successive working spaces V. FIG. 4(a) illustrates one working space $V_0$ as being charged with the refrigerant at an intake pressure. The refrigerant in the working space V is gradually compressed as the volume of the working space $V_0$ is decreased. When the working space $V_1$ is brought to a maximum compression position, the compressed refrigerant is discharged from the working space $V_1$ through a discharge port 114 in the cylinder 103 and through a discharge valve (not shown) into a discharge chamber 107a defined between the housing member 107 and the rear end plate 105. The discharged refrigerant is then recirculated from the discharge chamber 107a to the condenser 2 of the refrigeration cycle.

The front end plate 104 is formed therein with an unloading port P disposed at angularly spaced points to communicate the intake chamber 112 with working space V. An on-off valve 115 is provided to close and open the unloading port P.

When the unloading port P is opened by the valve 115, the working space V which is communicated with the unloading port P is not capable of performing its compression operation until after this working space is moved out of communication with the port P. Thus, this working space commences its compression operation from a volume $V_1$, as shown in FIG. 4(b). It will be seen from the comparison between FIGS. 4(a) and 4(b) that the initial or compression-starting volume $V_1$ in the case of the unloading port P being opened by the valve 115 is much smaller than the initial or compression-starting volume $V_0$ in the case of the port P being closed by the valve 115. In the illustrated embodiment of the invention, the unloading port P is positioned such that the volume $V_1$ is approximately 30–50% of the volume $V_0$.

Referring to FIG. 3, the valve 115 has a valve member 115a movable into and out of sealing engagement with peripheral edges of the unloading port P, a spring 115b resiliently biasing this valve member 115a in valve-opening direction, a bellow-phragm 115c adapted to actuate the valve member 115a to the valve-closed position and a cup-shaped member 115f acting as a spring retainer and guide for the bellow-phragm. The valve member 115a is made of a material having a high mechanical strength, such as a strainless steel. The outer surfaces of the cup-shaped member 115f and the bellow-phragm 115c cooperate with the housing member 106 of the compressor to define a pilot pressure chamber 115d which is connected to a pilot pressure passage 117 to the solenoid-operated pilot valve 12 to be described later. The passage 117 is provided therein with a restriction 117a which is operative to prevent the pilot pressure chamber 115d from being subjected to sudden increase in the pilot pressure applied thereto. The inner surfaces of the cup-shaped member 115f and the bellow-phragm 115c cooperate with the front end plate 104 to define chamber 115e which is communicated with the intake chamber 112 of the compressor 1.

The unloading port P and the valve 115 cooperate to constitute the compressor displacement varying means 11.

The pilot valve 12 is operative to control the actuator for the valve 115 associated with the unloading port P.

Figure 5:
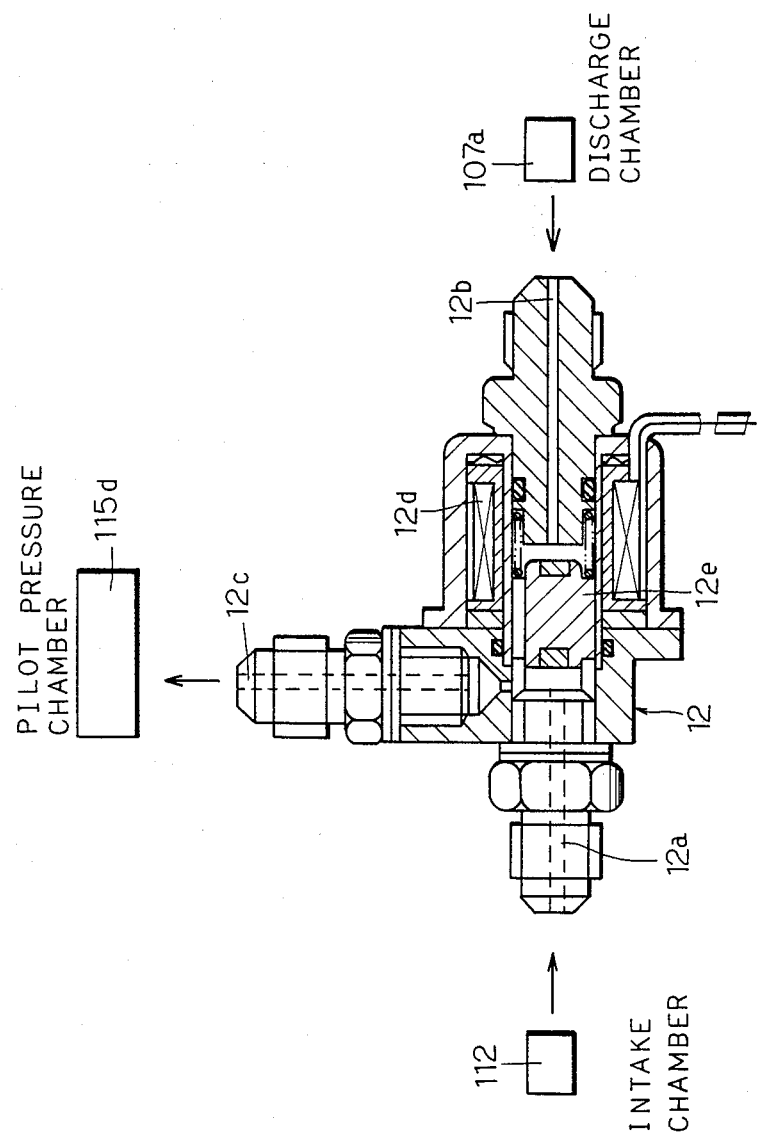
FIG. 5 is a partial sectional view of a solenoid valve used as a pilot for controlling the on-off valve shown in FIGS. 3 and 4.

The structural details of the pilot valve 12 is shown in FIG. 5. This valve 12 includes compressor intake pressure inlet port 12a pneumatically connected to the compressor intake chamber 112, compressor discharge pressure inlet port 12b pneumatically connected to the compressor discharge chamber 107a and pilot pressure outlet port 12c pneumatically connected to the pilot pressure chamber 115d in the compressor, as shown in FIG. 2. The pneumatic connections between the pilot valve 12 to the compressor 1 are shown in FIG. 2. The pilot valve 12 further includes a coil 12d adapted to be electrically energized and deenergized to electromagnetically actuate valve member 12e of a magnetic material so that the positions of the valve member 12e with respect to the pressure inlet ports 12a and 12b are selectively changed to communicate the pilot pressure outlet port 12c either with the compressor intake chamber 112 through the pressure inlet port 12a or with the compressor discharge chamber 107a through the pressure inlet port 12b.

When the pressure outlet port 12c is communicated with the compressor intake chamber 112, the pilot pressure chamber 115d is at the compressor intake pressure, so the spring 115d moves the valve member 115a away from the unloading port P to allow working space V to be communicated with the compressor intake chamber 112. On the other hand, with the pilot pressure outlet port 12c of the pilot valve is communicated with the compressor discharge chamber 107a, the compressor discharge pressure is introduced into the pilot pressure chamber 115d so that the valve member 115a is moved against the spring 115b into sealing engagement with the peripheral edges of the unloading port P to interrupt communication between the compressor intake chamber 112 and the working space V.

In order to prevent the solenoid-operated pilot valve 12 from being overheated, it is disposed at or adjacent to the point of the compressor 1 which is kept at relatively low temperature levels, such as a service valve (not shown) or the front housing member 106.

Figure 6:
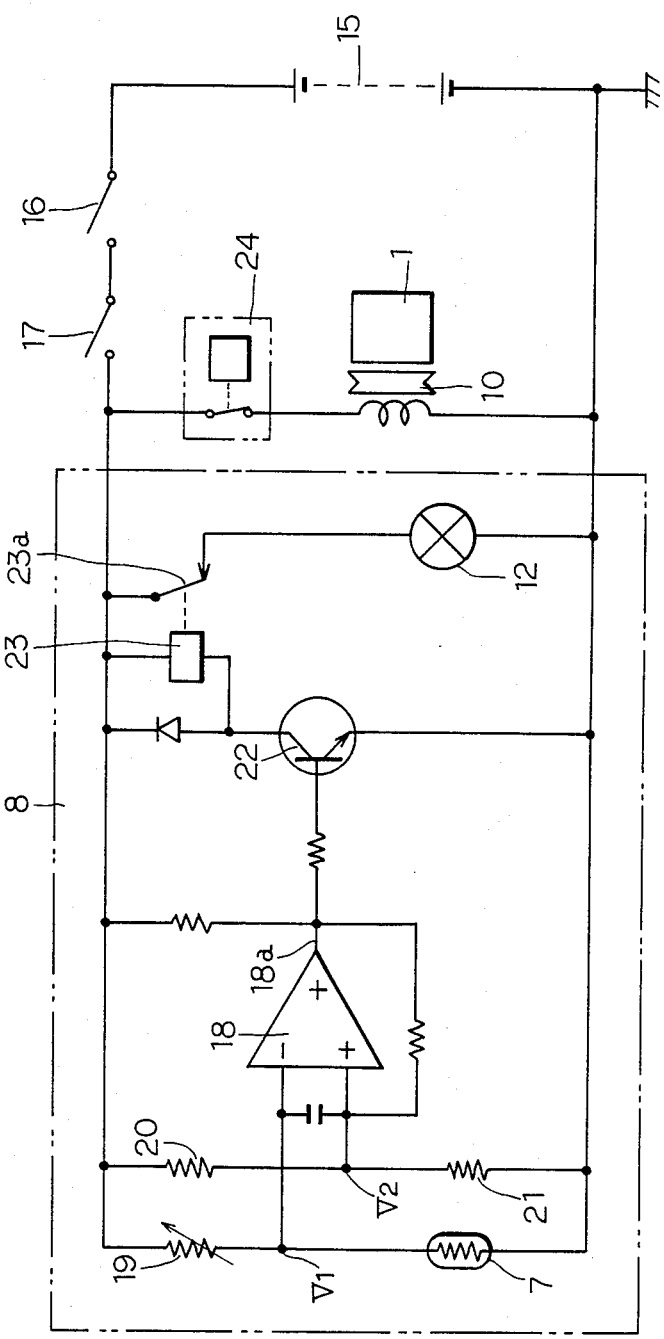
FIG. 6 shows an electric circuitry of the controlling circuit of the system shown in FIG. 1.
Figure 7:
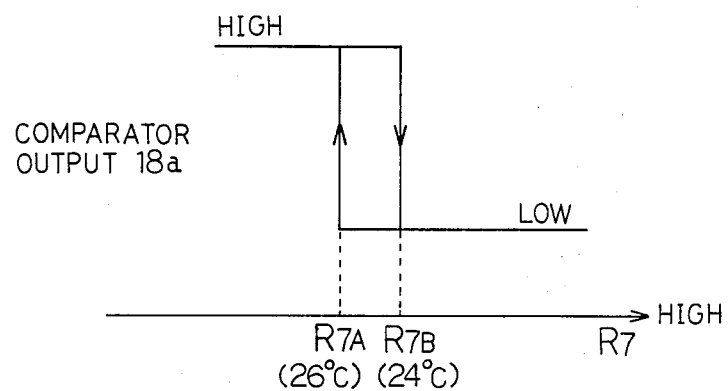
FIG. 7 illustrates the operation characteristics of the comparator of the electric circuitry shown in FIG. 6.
Figure 8:
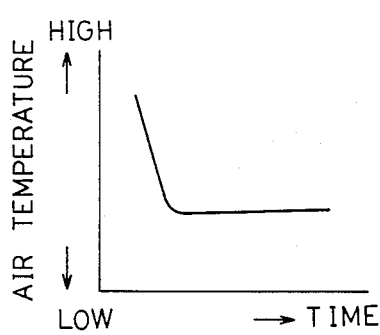
FIG. 8(a) graphically illustrates variations in the air just downstream of the evaporator according to the present invention.
FIG. 8(b) is a similar view to FIG. 8(a) but illustrates the air of the prior art evaporator.
Figure 8:
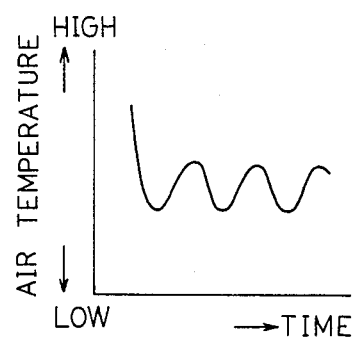

Referring now to FIG. 6, a practical example of the controlling circuit 8 includes comparator 18 operative to produce electrical output 18a which is determined by an electric potential $V_1$ dependant on a resistance $R_7$ of the thermistor of the sensor 7, and the resistance of a resistor 19, and a reference potential $V_2$ dependant on resistors 20 and 21. Variation in the thermistor resistance $R_7$ causes the comparator output 18a to be varied in a manner shown in FIG. 7.

When the surrounding air temperature is relatively high, for example higher than 26° C., the thermistor resistance $R_7$ is at a level smaller or lower than $R_{7A}$. At this time, the comparator output 18a is at its "High" level, so that the point 23a of the relay 23 is opened. Thus, the solenoid valve 12 is not energized, and the compressor is operated at its maximum (100%) displacement. When the surrounding air temperature is lowered, for example lower than 24° C., the thermistor resistance $R_7$ is increased to the level $R_{7B}$ so that the comparator output 18a will become "Low" level to switch the relay 23 on. Thus, the solenoid valve 12 is energized and opened to cause the compressor 1 to be operated at a lowered displacement level.

It is desirable in some instances to apply the temperature-dependent resistance of the sensor 7 to the valve 115 in any suitable form to actuate the valve 115, so that the valve 115 is opened and closed gradually in accord with the level of the resistance of the sensor 7. In this case it is possible to continuously and gradually control the opening area of the port P.

The operation of the system described above will be discussed hereunder. When the ambient air temperature is at a high level (higher than 26° C.) and the resistance $R_7$ of the thermistor of the sensor 7 is less than the level $R_{7A}$, the electrical supplies to the solenoid valve 12 are interrupted to cause the valve member 12e to block the compressor intake pressure inlet port 12a so that the compressor discharge pressure is fed through the pressure inlet port 12b and the pilot pressure outlet port 12c into the pilot pressure chamber 115d. Thus, the unloading port P is closed by the valve 115a to cause the compressor 1 to be operated at its maximum capacity or displacement.

The refrigerant is charged in the working space V through the intake port 113, and compressed. The compressed and heated refrigerant is discharged from the working space V through discharge port 114 into a discharge chamber 107a. Then the discharged refrigerant is recirculated to the condenser 2. In the condenser 2, the compressed and heated gaseous refrigerant becomes liquid refrigerant by the cooling. The liquid refrigerant is stored temporarily in the receiver 3. Then, the liquid is injected into the evaporator 5 through a small hole of the expansion valve 4.

The liquid is suddenly expanded and becomes cold vapor refrigerant under a low pressure. This cold refrigerant refrigerates the evaporator fins, which cool the air brought by the blower 14 and the cooled air refrigerates the room of the automobile. The gaseous refrigerant is sent to the compressor 1 through the throttling valve 6 which keeps the refrigerant pressure higher than a predetermined pressure so that the refrigerant is prevented to be cooled below 0° C. When the refrigerant pressure becomes lower than the predetermined pressure, a spring forces a valve body of the valve 6 to turn off or throttle the refrigerant from the evaporator 5 to compressor 1. This prevents to cool the refrigerant further in the evaporator, and to form frost or ice on the fins. The compressor 1 is operated without receiving substantial amount of refrigerant gas. Gradually the evaporator 5 is heated by the air and the gaseous refrigerant pressure becomes higher, and opens the throttling valve 6, again gaseous refrigerant is sent from the evaporator 5 to the compressor 1.

When the ambient air temperature is lowered and the thermistor resistance R7 is increased to a level R7B, the coil 12d of the pilot valve 12 is electrically energized to actuate the valve member 12e to a position in which the compressor intake pressure inlet port 12a is unblocked and communicated with the pilot pressure outlet port 12c. Thus, the compressor intake pressure is now applied to the pilot pressure chamber 115d to cause the valve member 115a of the valve 115 to be moved by the spring 115b to a valve-open position. Thus, the unloading port P is now opened to reduce the compressor displacement to a level equal to from 30% to 50% of the maximum displacement.

The refrigerant discharged under the reduced compressor displacement flows in the same way as under the maximum displacement.

Figure 9:
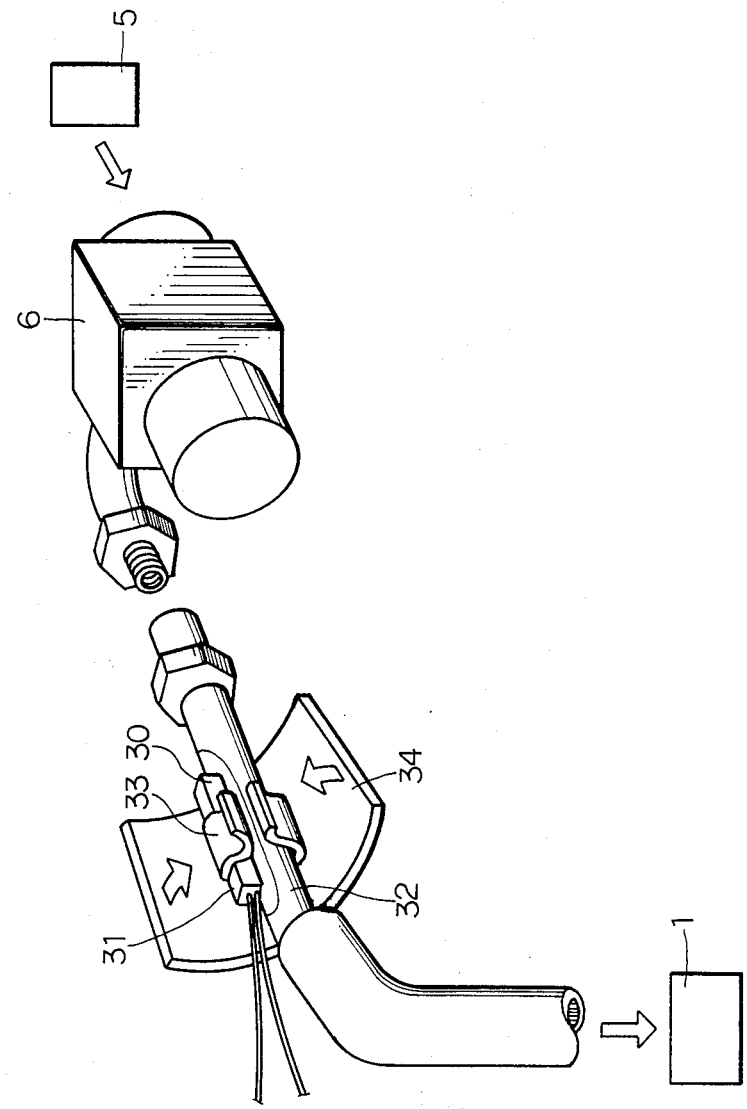
FIG. 9 is a perspective view of a part of refrigerant conduit between a throttling valve and a compressor equipped with a temperature sensor.

The refrigeration system mentioned above employs a thermistor as the sensor 7. Instead of the thermistor, a temperature switch can be used. An example using temperature switch 30 is shown in FIG. 9. The temperature switch 30 is a kind of reed switch using thermal ferrite and encased within an aluminum box 31 which is fixed on the surface of a conduit 32 by a clamp 33 and covered with a thermal insulator 34. The conduit 32 is made of aluminum and connects the throttling valve 6 with the compressor 1. The switch 30 works to turn on at −1° C. and turn off at 3° C.

Figure 10:
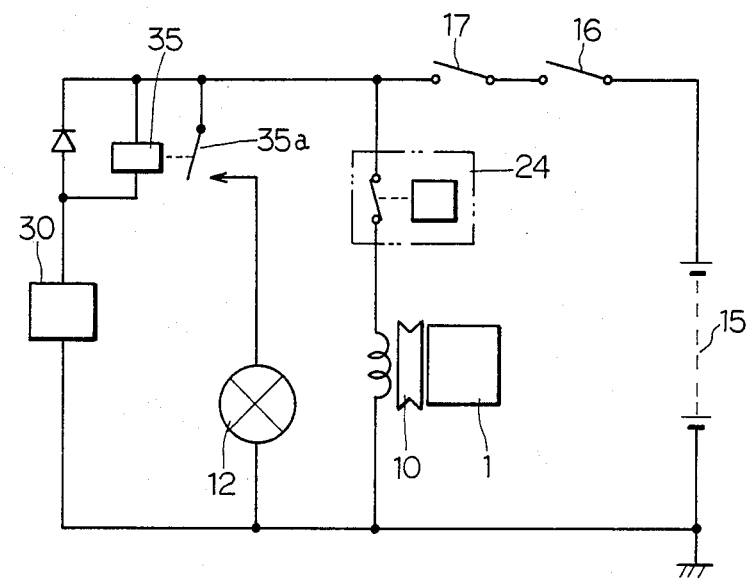
FIG. 10 shows an electric circuitry of the controlling circuit equipped with the sensor shown in FIG. 9.

A controlling circuit employing the temperature switch 30 is shown in FIG. 10. This circuit is similar to that shown in FIG. 6. In this circuit, the temperature switch 30 works to shift directly the relay 35. When the temperature of the conduit 32, namely the temperature of the refrigerant gas flowing through the conduit 32, rises higher than 3° C., the temperature switch 30 turns off and the relay 35 opens the contact 35a so that the solenoid valve 12 is not energized. The compressor 1 is operated at its maximum (100%) displacement. On the other hand, when the temperature of the conduit 32 comes down below −1° C., the switch 30 turns on, and the relay 35 closes the contact 35a so that the compressor 1 is operated at 30–50% of the maximum displacement capacity.

It is preferable to detect the temperature of the conduit 32 between the throttling valve 6 and the compressor 1, since, first, it is much easier than drilling a hole through the conduit 32 and detect the temperature of the refrigerant in there, and second, it enables to effectively reduce the capacity of the compressor 1 during the time when the compressor 1 is wasting its energy. In other words, when the throttling valve 6 is reducing the area of its communication passage to reduce the refrigerant flow therethrough, thus reducing the temperature of the conduit 32, it is indicating that no more operation of the compressor 1 is needed. Therefore it is better to reduce the capacity of the compressor at this time.

Figure 11:
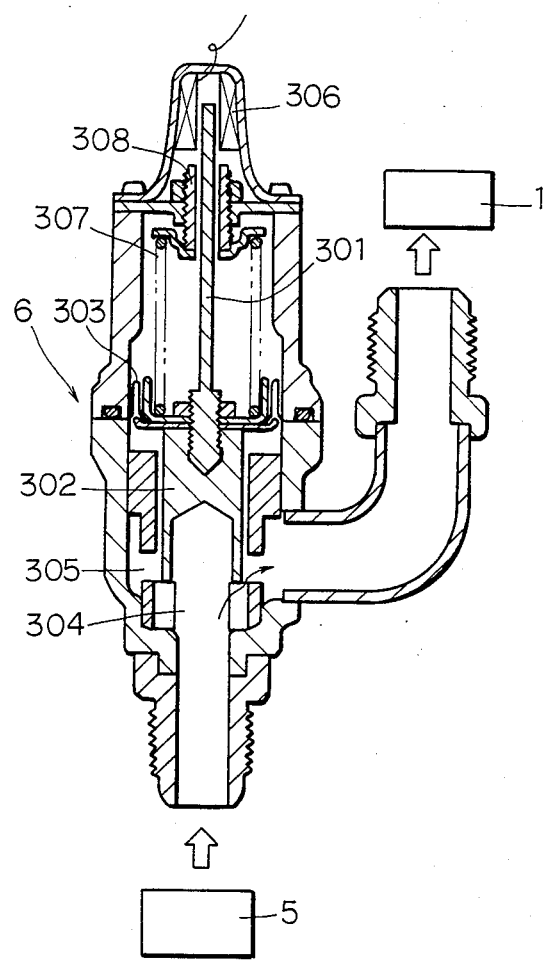
FIG. 11 shows a cross-sectional view of the throttling valve equipped with another sensor at the throttling valve.

Another embodiment for detecting the condition of the refrigeration cycle is shown in FIGS. 11 and 12. Numeral 301 shows a rod integral with a valve body 302 which moves up and down in accordance with the pressure of the refrigerant applied thereto and a diaphragm 303. The condition of the valve body 302 in FIG. 11 shows "closed" position to allow only a small amount of flow of the refrigerant through a passage 304. When the valve body 302 is lifted, a larger amount of refrigerant flows therethough via a widely opened throttling port 305 at that time. The movement of the rod 301 is detected by a differential transformer 306 which generates electromotive force in accordance with the position of the rod 301. The valve body 302 is biased by a spring 307 which is adjustable by an adjust screw 308 through which the rod 301 passes to the differential transformer 306.

The signal or electromotive force from the differential transformer 306 causes to turn on and off a power transistor 502 through an amplifier 501 as shown in FIG. 12. When the transistor 502 is in "ON" condition, it allows to flow therethrough a current which is proportionate to the magnitude of the electromotive force at transformer 306.

Thus the arrangement above enables to actuate the valve 12 and therefore the valve 115 gradually so that the port P is opened or closed in response to the position of the rod 301. In this case, it is possible to adopt a linear solenoid valve as the valve 12 and have the valve 12 open or close the port P directly in response to the position of the rod 301. It is also preferable to construct the circuit and other parts to control the valve 115 in such a manner that the compressor 1 operates at 100% capacity at one time and 30%–50% capacity at the other time. Of course it is also possible to increase the steps in which the compressor operates at respective capacities, i.e. 3-step, 5-st or 7-step operation In the described embodiments of the invention, the ambient air temperature and the conduit temperature as well as the movement of the valve body of the throttling valve are detected for the displacement control of the compressor. However, the temperature detector or sensor may alternatively be disposed to detect the temperature of the refrigerant in the evaporator 5 or other refrigerant conduits. The temperature sensor 31 and the position sensor 306 may be replaced by a pressure sensor for detecting the refrigerant pressure in the conduit 32 located between the throttling valve 6 and compressor 1. The position sensor 306 may be of resistance type, i.e. it may detect the position of the rod 301 by the resistance which varies as the rod 301 moves. Also it is possible to adopt a capacitance varying type sensor.

The compressor 1 used in the described embodiments is not limited to the vane type and may alternatively be of another type.

It will be appreciated from foregoing description that the refrigeration system according to the present invention provides a sensor for cooling load and a multi-stage or continuous compressor displacement control so that the compressor displacement can be automatically varied stepwise or gradually to match with variable demand or cooling load to advantageously provide pleasant air-conditioning, minimize the power and the noise at the compressor and keep the air temperature relatively constant to give the good feeling to users.

What we claim is:

1. An automotive refrigeration system comprising:
   a variable capacity refrigerant compressor;
   means connected with said compressor for varying the displacement of said compressor;
   an evaporator coupled to said compressor in said refrigeration system for evaporating said refrigerant;
   a conduit connecting said evaporator to said compressor;
   a throttling valve disposed in said conduit, said throttling valve having a valve body therein capable of assuming any position between limits for throttling to any degree between limits a flow of said refrigerant through said conduit to said compressor in response to a pressure of said refrigerant applied thereto to control a pressure in said evaporator constant;
   means for detecting said position of said valve body to generate a signal which varies as said position of said valve body varies between said limits; and
   electric circuit means connected with said position detecting means and said compressor displacement varying means for actuating said compressor displacement varying means in response to said signal from said position detecting means.

2. An automotive refrigeration system as claimed in claim 1, wherein said throttling valve further includes a rod connected with said valve body for transmitting a movement of said valve body, and said position detecting means detecting the position of said rod to generate said signal.

3. An automotive refrigeration system as claimed in claim 1, wherein said electric circuit means controls said compressor displacement varying means to control the displacement of said compressor stepwise in response to said signal from said position detecting means.

4. An automotive refrigeration system as claimed in claim 1, wherein said electric circuit means controls said compressor displacement varying means to control the displacement of said compressor continuously in response to said signal from said position detecting means.

* * * * *